(12) United States Patent
Huang

(10) Patent No.: US 6,671,967 B1
(45) Date of Patent: Jan. 6, 2004

(54) BLADES OF GARDENING SHEARS

(76) Inventor: Yu-Hsin Huang, No. 2, Alley 1, Lane 722, Sec. 4, Yen Hai Rd., Fu Shing Hsiang, Chang Hua Hsien (TW)

( * ) Notice: Subject to any disclaimer, the term of this patent is extended or adjusted under 35 U.S.C. 154(b) by 0 days.

(21) Appl. No.: 10/162,328

(22) Filed: Jun. 5, 2002

(51) Int. Cl.[7] ............................................... B26B 13/06
(52) U.S. Cl. ............................ 30/258; 30/254; 30/351
(58) Field of Search ....................... 30/254, 258, 351, 30/112, 244, 249

(56) References Cited

U.S. PATENT DOCUMENTS

| | | | | |
|---|---|---|---|---|
| 365,541 A | * | 6/1887 | Schollars | ................... 30/254 |
| 909,347 A | * | 1/1909 | Tolman | ..................... 30/112 |
| 2,338,007 A | * | 12/1943 | Morris | ...................... 30/351 |
| D201,915 S | * | 8/1965 | Werner | ......................... D8/58 |
| 4,422,240 A | * | 12/1983 | Wallace et al. | ............... 30/254 |
| 4,999,985 A | * | 3/1991 | Doi | .............................. 30/240 |

* cited by examiner

*Primary Examiner*—Hwei-Siu Payer
(74) *Attorney, Agent, or Firm*—Harrison & Egbert

(57) ABSTRACT

A pair of gardening shears includes two blades which are pivoted together and are provided with a plurality of through holes. The through holes are arranged at intervals along the longitudinal direction of the blades and are progressively smaller in diameter from the pivoting end toward the free end of the blades. The through holes of one blade alternate with the through holes of the other blade.

2 Claims, 5 Drawing Sheets

BLADES OF GARDENING SHEARS

FIELD OF THE INVENTION

The present invention relates generally to a pair of gardening shears, and more particularly to two blades of the gardening shears.

BACKGROUND OF THE INVENTION

As shown in FIG. 1, a pair of gardening shears of the prior art comprises two opposing blades 05 which are pivoted together so that they work against each other to attain the pruning of the garden plants. In the pruning process, the broken bits and pieces of leaf and twig of the garden plants are apt to deposit on the surface of the blades 05, thereby undermining the scissors action of the two opposing blades 05. As a result, the user of the prior art gardening shears is often frustrated by an additional chore calling for removal of the fragments deposited on the blades 05.

BRIEF SUMMARY OF THE INVENTION

The primary objective of the present invention is to provide a pair of gardening shears free of the deficiencies of the prior art gardening shears described above.

In keeping with the principle of the present invention, the foregoing objective of the present invention is attained by a pair of gardening shears, which comprise two opposing blades, each having a plurality of through holes. The through holes of the two opposing blades serve to reduce the contact area between the two blades, thereby resulting in enhancement of the scissoring action of the two opposing blades. In addition, the through holes of the two blades work to remove debris of leaves and twigs of the garden plants.

The features and the advantages of the present invention will be more readily understood upon a thoughtful deliberation of the following detailed description of the present invention with reference to the accompanying drawings.

DETAILED DESCRIPTION OF THE INVENTION

As shown in FIGS. 2–5, a pair of gardening shears of the present invention comprises two handles 10, and two blades 20 pivoted together by a pivot 30 so that they work against each other to bring about the scissors action by which leaves and twigs of the garden plants are cut.

The present invention is characterized by the two blades 20 which are provided with a plurality of through holes 21. The through holes 21 serve to reduce the friction area between the two opposing blades 20 at work. In addition, the through holes 21 serve to remove fragments of leaves and twigs of the garden plants from the surfaces of the two opposing blades 20 in action, so as to prevent the fragments from undermining the scissors action of the two opposing blades 20.

Figure 1:
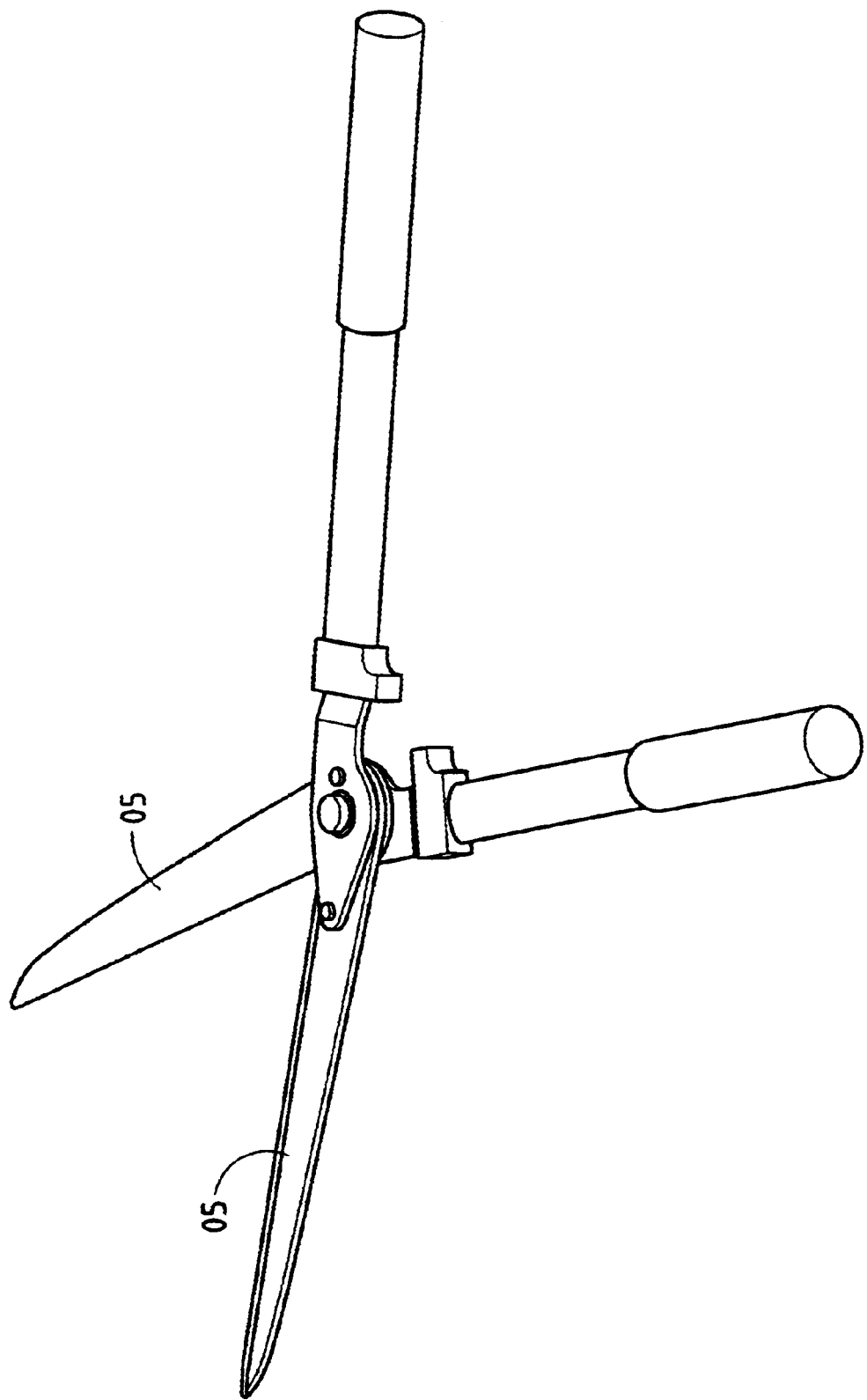
FIG. 1 shows a perspective view of a pair of gardening shears of the prior art.
Figure 2:
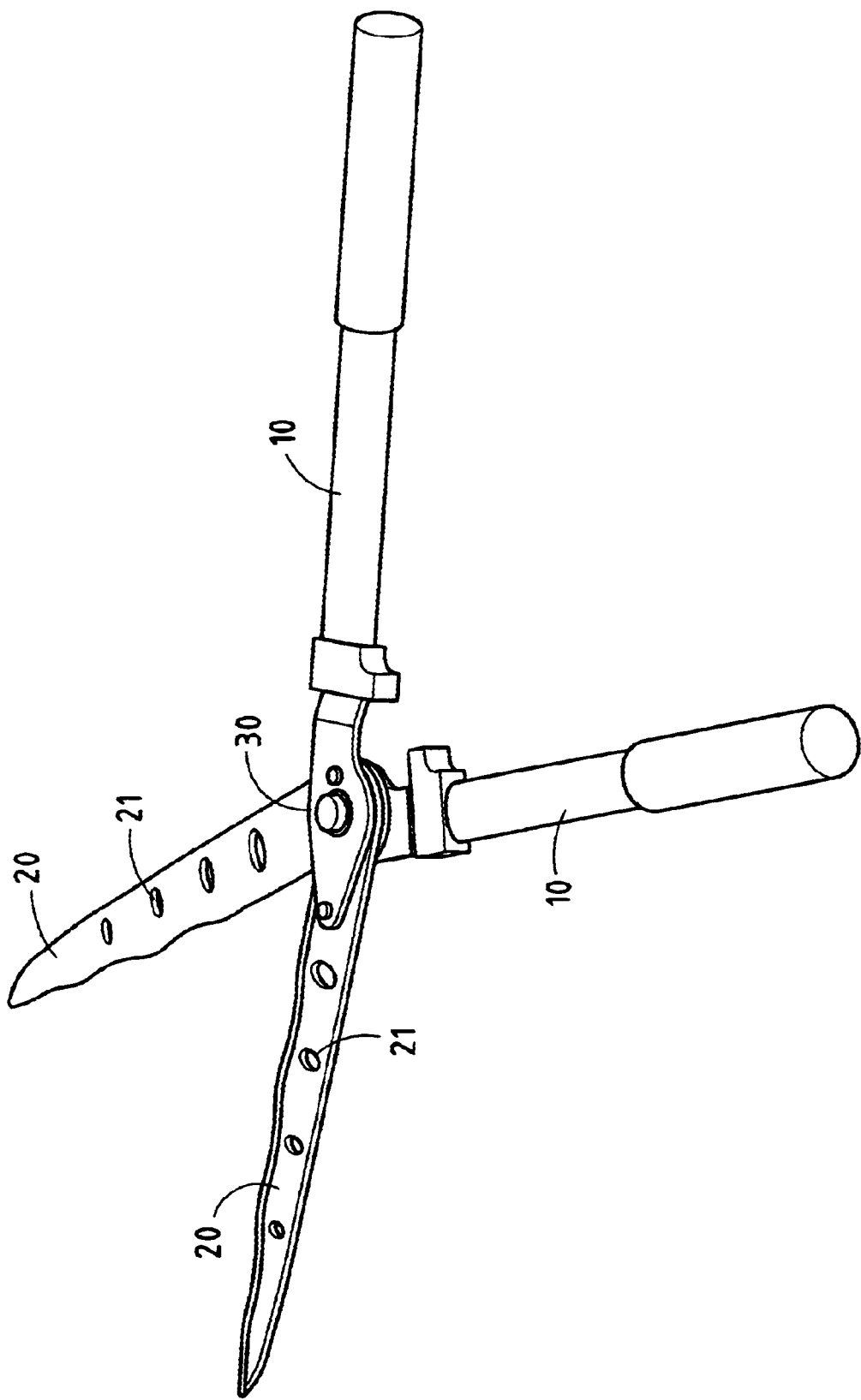
FIG. 2 shows a perspective view of a first preferred embodiment of the present invention.
Figure 3:
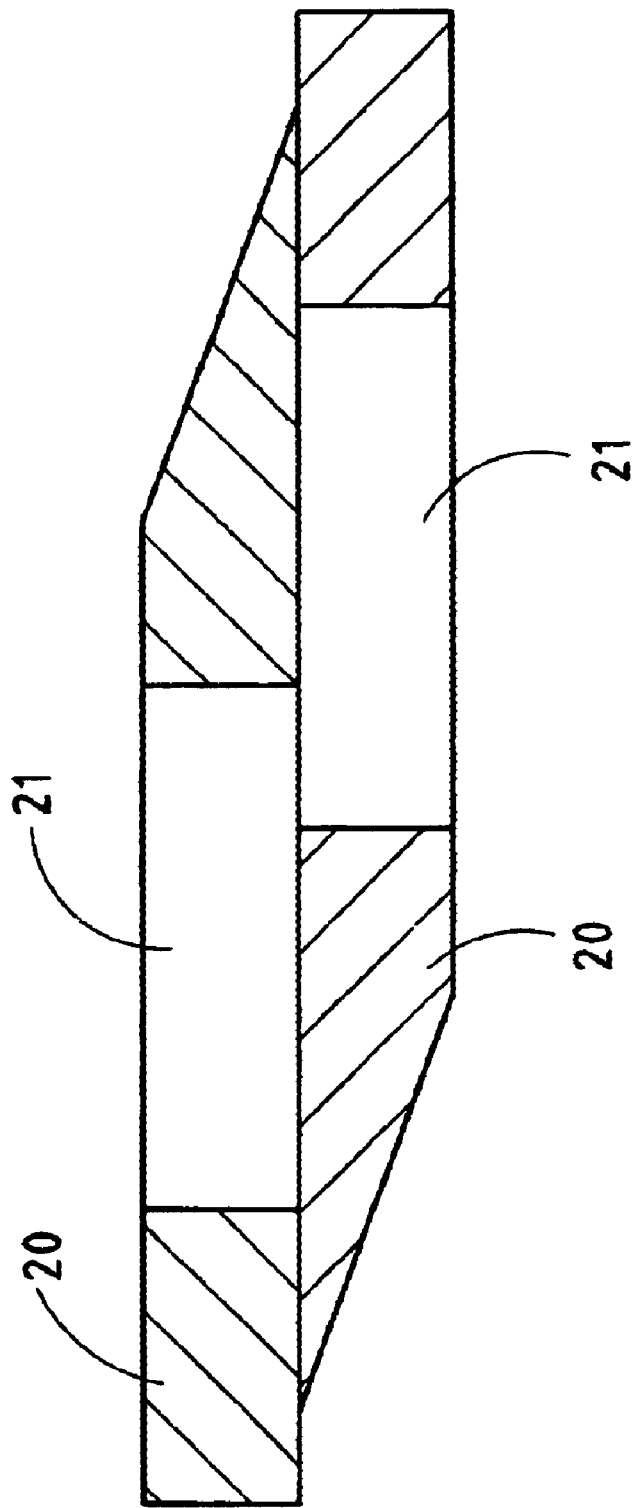
FIG. 3 shows a sectional view of two opposing blades of the first preferred embodiment of the present invention.
Figure 4:
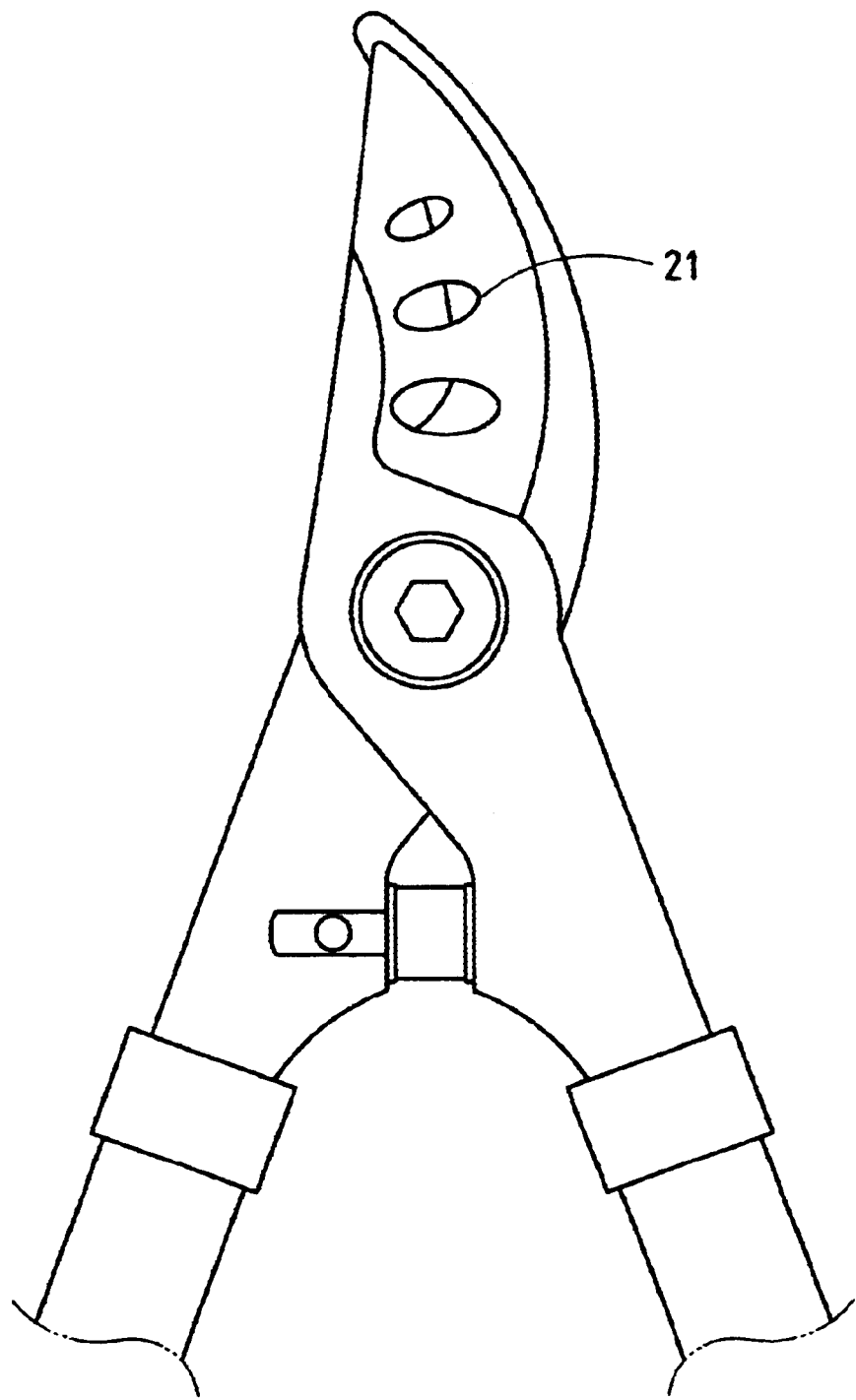
FIG. 4 shows a schematic plan view of a second preferred embodiment of the present invention.
Figure 5:
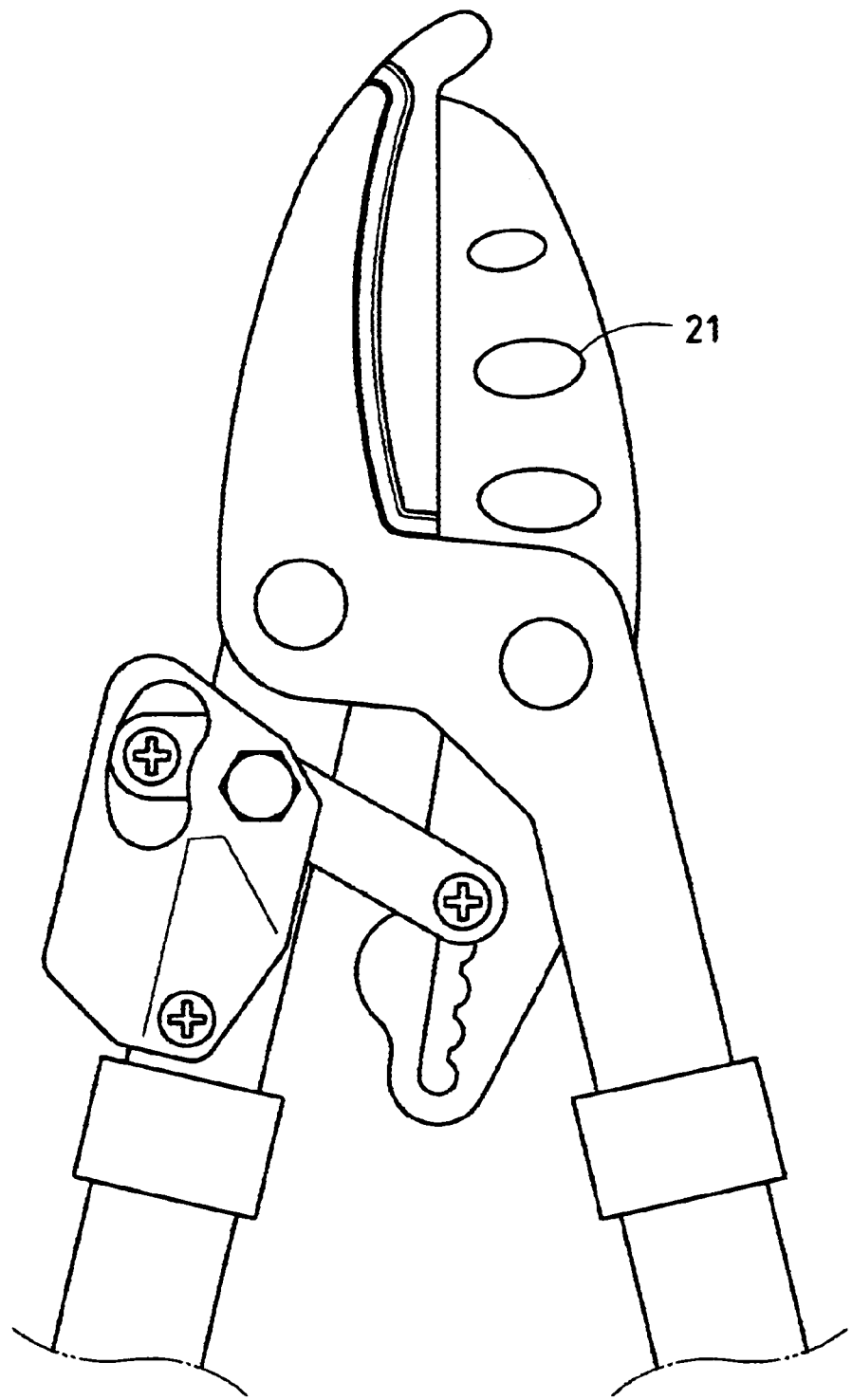
FIG. 5 shows a schematic plan view of a third preferred embodiment of the present invention.

The through holes 21 vary in diameter such that the through hole diameter is progressively smaller from the pivoting end toward the free end of the blades 20. In addition, the through holes 21 of one of the two blades 20 alternate with the through holes 21 of the other one of the two blades 20, as shown in FIG. 3.

It must be noted here that the through holes 21 of the two blades 20 are arranged at intervals along the longitudinal direction of the blades 20.

I claim:

1. A pair of gardening shear comprising:

a pair of handles;

a pair of opposing blades respectively connected to said pair of handles, said pair of opposing blades pivoted together such that said pair of blades work against each other so as to cause a scissoring action suitable for cutting leaves and twigs of garden plants, each of said pair of opposing blades having a pivoting end and a free end, each of said pair of opposing blades having a plurality of through holes formed therein such that said plurality of through holes are arranged at intervals longitudinally along the blade, one of said plurality of holes having a different diameter than another of said plurality of holes such that said plurality of through holes are progressively smaller in diameter from said pivoting end toward said free end of the blade.

2. A pair of gardening shears comprising:

a pair of handles;

a pair of opposing blades respectively connected to said pair of handles, said pair of opposing blades pivoted together such that said pair of blades work against each other so as to cause a scissoring action suitable for cutting leaves and twigs of garden plants, each of said pair of opposing blades having a pivoting end and a free end, each of said pair of opposing blades having a plurality of through holes formed therein such that said plurality of through holes are arranged at intervals longitudinally along the blade, the through holes of one of said pair of opposing blades alternating in location with the through holes of the other of said pair of opposing blades.

* * * * *